No. 856,063. PATENTED JUNE 4, 1907.
L. O. HOWELL.
EXPANSIBLE PIPE CLEANER.
APPLICATION FILED MAR. 30, 1904.
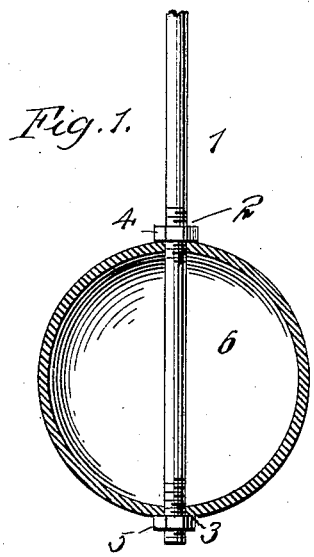
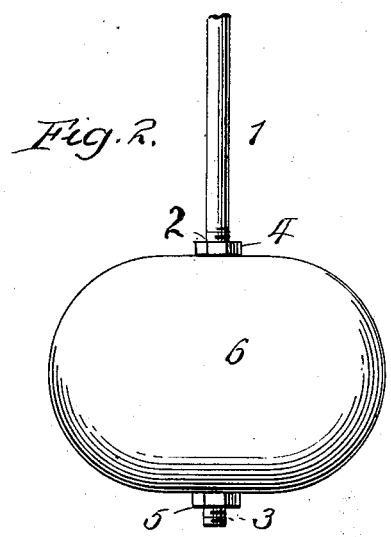
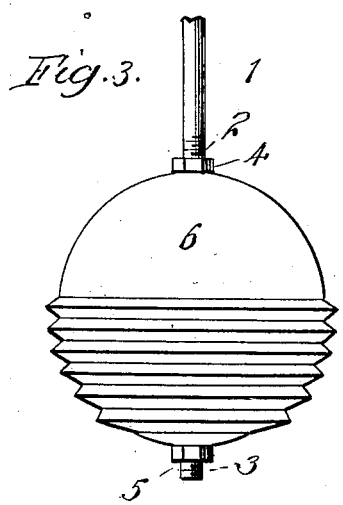
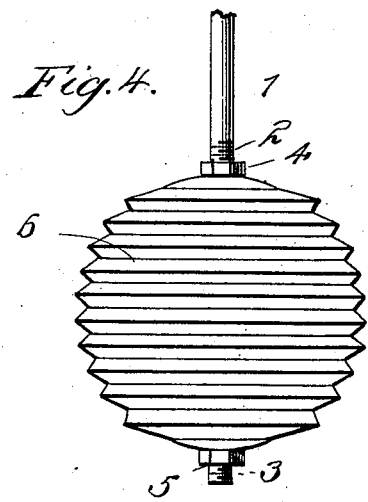
WITNESSES:
Karen Larsen
C A Pierce
INVENTOR
Lewis O. Howell,
BY A. M. Pierce,
ATTORNEY.

UNITED STATES PATENT OFFICE.

LEWIS O. HOWELL, OF PHILADELPHIA, PENNSYLVANIA, ASSIGNOR, BY MESNE ASSIGNMENTS, TO SANITARY APPLIANCE COMPANY, OF PHILADELPHIA, PENNSYLVANIA, A CORPORATION OF PENNSYLVANIA.

EXPANSIBLE PIPE-CLEANER.

No. 856,063.      Specification of Letters Patent.      Patented June 4, 1907.

Application filed March 30, 1904. Serial No. 200,697.

*To all whom it may concern:*

Be it known that I, LEWIS O. HOWELL, a citizen of the United States, and a resident of Philadelphia, in the county of Philadelphia and State of Pennsylvania, have invented certain new and useful Improvements in Expansible Pipe-Cleaners, of which the following is a specification.

My invention relates especially to devices employed for cleaning drain pipes, and has for its object the provision of a cleaner so arranged as to be adjustable and changeable in diameter, making it suitable and efficient for use in cleaning pipes of different sizes.

To attain the desired end, my invention consists essentially in a manipulating handle provided at one extremity with a ball, sphere or body of flexible material, means being provided for compressing or flattening said body, thereby expanding the diameter thereof at right angles to the handle; and my invention also involves certain novel and useful combinations or arrangements of parts, and peculiarities of construction and operation, all of which will be hereinafter first fully described and then pointed out in the claims.

In the accompanying drawing, forming a part hereof, Figure 1 is a side view of my improved cleaner or plunger, the flexible ball or body being shown in section. Fig. 2 is a side elevation showing the flexible body flattened and expanded. Figs. 3 and 4 are side elevations of a flexible body having the exterior surface of different configurations.

Similar numerals of reference, wherever they occur, indicate corresponding parts in all the figures.

1 is a manipulating handle made of metal, or of wood with a metal extremity, or in any other approved manner or material. The handle is screwthreaded at 2 and 3, for the reception of nuts 4 and 5.

6 is a body, ball or sphere, made of flexible material, such as rubber. This body may be made hollow, as illustrated in Fig. 1 of the drawing, and have a smooth exterior surface, as in said figure and in Fig. 2; partially smooth and partially corrugated, as in Fig. 3, or entirely corrugated, as in Fig. 4.

When the parts are in the position shown in Fig. 1, the flexible body is at its normal diameter, and ready for use as a plunger or cleaner for the smallest pipe into which it can be forced. If it is desired to use the plunger or cleaner in a pipe of larger diameter, by simply screwing the nut 4 down upon the flexible body 6, said body is flattened out and expanded in diameter at right angles to the manipulating handle 1 in such a manner as to adapt it for use in large pipes, permitting an accurate adjustment in accordance with the work to be done.

Having now fully described my invention, what I claim as new therein and desire to secure by Letters Patent, is:

As a new article of manufacture, an expansible pipe cleaner in which is comprised a hollow, corrugated body of rubber, or equivalent material, a handle extending therethrough bearing a nut or head at its outer extremity, a screwthread at 2 on the handle, and an adjusting nut engaging with said thread, substantially as shown and described.

Signed at Philadelphia in the county of Philadelphia and State of Pennsylvania this 9th day of March A. D. 1904.

LEWIS O. HOWELL.

Witnesses:
     DAVID Y. EIRENBERRY,
     WM. L. SWORD.